US010936984B2

(12) United States Patent
Huneycutt et al.

(10) Patent No.: US 10,936,984 B2
(45) Date of Patent: Mar. 2, 2021

(54) SYSTEM FOR MITIGATING EXPOSURE ASSOCIATED WITH IDENTIFIED IMPACTS OF TECHNOLOGICAL SYSTEM CHANGES BASED ON SOLUTION DATA MODELLING

(71) Applicant: BANK OF AMERICA CORPORATION, Charlotte, NC (US)

(72) Inventors: Katy Leigh Huneycutt, Oakboro, NC (US); Richard LeRoy Hayes, Charlotte, NC (US); Aaron Dion Kephart, Denver, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 165 days.

(21) Appl. No.: 15/974,269

(22) Filed: May 8, 2018

(65) Prior Publication Data
US 2019/0347592 A1 Nov. 14, 2019

(51) Int. Cl.
*G06Q 10/06* (2012.01)
*G06F 16/245* (2019.01)
*G06F 16/248* (2019.01)

(52) U.S. Cl.
CPC ....... *G06Q 10/0637* (2013.01); *G06F 16/245* (2019.01); *G06F 16/248* (2019.01)

(58) Field of Classification Search
CPC .................. G06Q 10/00; G06Q 10/06315
USPC ............................................. 705/7.11–7.25
See application file for complete search history.

(56) References Cited

U.S. PATENT DOCUMENTS

| 6,167,564 | A  | 12/2000 | Fontana et al. |
| 6,883,120 | B1 | 4/2005  | Banga |
| 7,617,210 | B2 | 11/2009 | Lew et al. |
| 7,661,135 | B2 | 2/2010  | Byrd et al. |
| 7,747,738 | B2 | 6/2010  | Ellisor, Jr. |
| 8,091,065 | B2 | 1/2012  | Mir et al. |
| 8,131,606 | B2 | 3/2012  | Bellacicco et al. |
| 8,150,783 | B2 | 4/2012  | Gonsalves et al. |
| 8,265,980 | B2 | 9/2012  | Ochs et al. |
| 8,418,246 | B2 | 4/2013  | McConnell |
| 8,447,722 | B1 | 5/2013  | Ahuja et al. |
| 8,504,683 | B2 | 8/2013  | Ellisor, Jr. |
| 8,544,098 | B2 | 9/2013  | Gustave et al. |
| 8,655,757 | B1 | 2/2014  | Wookey et al. |
| 8,719,066 | B2 | 5/2014  | Cartwright |
| 8,732,840 | B2 | 5/2014  | Howes et al. |

(Continued)

*Primary Examiner* — Romain Jeanty
(74) *Attorney, Agent, or Firm* — Michael A. Springs; Moore & Van Allen PLLC; Nicholas C. Russell

(57) ABSTRACT

Embodiments of the present invention provide a system for mitigating exposure associated with identified impacts of technological system changes based on solution data modeling. The system is typically configured for generating solution data models comprising a plurality of asset systems and a plurality of users, store the solution data models in a model database, receive an input associated with a technological system change associated with a first asset, access a solution data model associated with the first asset, identify one or more relationships from the accessed solution data model, identify an impact associated with the technological system change, determine a category of exposure based on the identified impact, display the category of exposure and impact to a user, receive mitigation steps associated with the technological system change, and implement the mitigation steps.

20 Claims, 6 Drawing Sheets

(56) References Cited

U.S. PATENT DOCUMENTS

| | | |
|---|---|---|
| 8,781,930 B2 * | 7/2014 | Paulus .................. G06Q 99/00 705/35 |
| 8,805,989 B2 | 8/2014 | Hemachandran et al. |
| 8,819,010 B2 | 8/2014 | Fankhauser et al. |
| 8,838,759 B1 | 9/2014 | Eatough et al. |
| 8,874,455 B2 | 10/2014 | Gosain |
| 9,049,226 B1 | 6/2015 | Duane |
| 9,122,564 B1 | 9/2015 | Dong et al. |
| 9,241,008 B2 | 1/2016 | Powell et al. |
| 9,298,927 B2 | 3/2016 | Lietz et al. |
| 9,392,013 B1 | 7/2016 | Duane |
| 9,569,445 B2 | 2/2017 | Flores et al. |
| 9,613,111 B2 | 4/2017 | Gibbons |
| 9,654,510 B1 | 5/2017 | Pillai et al. |
| 9,817,969 B2 | 11/2017 | Lee et al. |
| 9,825,953 B2 | 11/2017 | Gibbons |
| 10,169,121 B2 | 1/2019 | Vibhor et al. |
| 10,216,769 B1 | 2/2019 | Chase et al. |
| 10,313,387 B1 | 6/2019 | Kras |
| 2004/0044912 A1 | 3/2004 | Connary et al. |
| 2004/0243822 A1 | 12/2004 | Buchholz et al. |
| 2005/0065841 A1 * | 3/2005 | Middleton ....... G06Q 10/06375 705/7.36 |
| 2005/0127171 A1 | 6/2005 | Ahuja et al. |
| 2005/0165633 A1 | 7/2005 | Huber |
| 2005/0174235 A1 | 8/2005 | Davis et al. |
| 2005/0216757 A1 | 9/2005 | Gardner |
| 2006/0059253 A1 * | 3/2006 | Goodman .............. G06Q 10/10 709/223 |
| 2006/0106796 A1 | 5/2006 | Venkataraman et al. |
| 2006/0272020 A1 | 11/2006 | Gardner |
| 2007/0005558 A1 | 1/2007 | Canfield |
| 2007/0100643 A1 | 5/2007 | Paulus et al. |
| 2007/0103294 A1 | 5/2007 | Bonecutter et al. |
| 2007/0113281 A1 | 5/2007 | Leach |
| 2007/0143851 A1 | 6/2007 | Nicodemus et al. |
| 2007/0250410 A1 | 10/2007 | Brignone et al. |
| 2008/0015889 A1 | 1/2008 | Fenster |
| 2008/0028467 A1 | 1/2008 | Kommareddy et al. |
| 2008/0042809 A1 | 2/2008 | Watts et al. |
| 2008/0082348 A1 | 4/2008 | Paulus et al. |
| 2008/0133594 A1 | 6/2008 | Fotinatos et al. |
| 2008/0172262 A1 | 7/2008 | An et al. |
| 2008/0263103 A1 | 10/2008 | McGregor et al. |
| 2009/0006149 A1 | 1/2009 | Yarter |
| 2009/0030880 A1 | 1/2009 | Melamed |
| 2009/0094484 A1 | 4/2009 | Son et al. |
| 2009/0210427 A1 | 8/2009 | Eidler et al. |
| 2010/0011410 A1 | 1/2010 | Liu |
| 2010/0081417 A1 | 4/2010 | Hickie |
| 2010/0198635 A1 | 8/2010 | Pirtle et al. |
| 2010/0205014 A1 | 8/2010 | Sholer et al. |
| 2010/0268568 A1 | 10/2010 | Ochs et al. |
| 2010/0324952 A1 | 12/2010 | Bastos et al. |
| 2011/0126111 A1 | 5/2011 | Gill et al. |
| 2011/0145400 A1 | 6/2011 | Dodson |
| 2011/0271319 A1 | 11/2011 | Venable, Sr. |
| 2011/0288692 A1 | 11/2011 | Scott |
| 2012/0114119 A1 | 5/2012 | Ahuja et al. |
| 2012/0216243 A1 | 8/2012 | Gill et al. |
| 2012/0224057 A1 | 9/2012 | Gill et al. |
| 2013/0055404 A1 | 2/2013 | Khalili |
| 2013/0091539 A1 | 4/2013 | Khurana et al. |
| 2013/0151229 A1 | 6/2013 | Braman et al. |
| 2013/0218890 A1 | 8/2013 | Fernandes et al. |
| 2013/0227697 A1 | 8/2013 | Zandani |
| 2013/0246037 A1 | 9/2013 | Ceglia et al. |
| 2013/0262328 A1 | 10/2013 | Federgreen |
| 2013/0297370 A1 | 11/2013 | Pegden |
| 2014/0089039 A1 | 3/2014 | McClellan |
| 2014/0100913 A1 | 4/2014 | Backer et al. |
| 2014/0129536 A1 | 5/2014 | Anand et al. |
| 2014/0181893 A1 | 6/2014 | Von Bokem et al. |
| 2014/0201836 A1 | 7/2014 | Amsler |
| 2014/0207774 A1 | 7/2014 | Walter et al. |
| 2014/0259170 A1 | 9/2014 | Amsler |
| 2014/0278664 A1 | 9/2014 | Loomis |
| 2014/0280889 A1 | 9/2014 | Nispel et al. |
| 2014/0282189 A1 | 9/2014 | Bansal et al. |
| 2015/0271207 A1 | 9/2015 | Jaiswal et al. |
| 2015/0288702 A1 | 10/2015 | Choe et al. |
| 2015/0293800 A1 | 10/2015 | Shivanna et al. |
| 2015/0312335 A1 | 10/2015 | Ying et al. |
| 2016/0196501 A1 | 7/2016 | Anand et al. |
| 2016/0330132 A1 | 11/2016 | Rickey |
| 2016/0359899 A1 | 12/2016 | Zandani |
| 2017/0006033 A1 | 1/2017 | Stecher et al. |
| 2017/0017934 A1 | 1/2017 | Bou-Ghannam et al. |
| 2017/0026400 A1 | 1/2017 | Adams et al. |
| 2017/0126710 A1 | 5/2017 | De-levie et al. |
| 2017/0214717 A1 | 7/2017 | Bush et al. |
| 2017/0249642 A1 | 8/2017 | Burpulis et al. |
| 2017/0339178 A1 | 11/2017 | Mahaffey et al. |
| 2017/0353480 A1 | 12/2017 | Gao et al. |
| 2018/0007046 A1 | 1/2018 | Oberheide et al. |
| 2018/0124098 A1 | 5/2018 | Carver et al. |
| 2018/0139227 A1 | 5/2018 | Martin et al. |
| 2018/0288045 A1 | 10/2018 | Karunakaran et al. |
| 2018/0293511 A1 | 10/2018 | Bouillet et al. |
| 2018/0336334 A1 | 11/2018 | Yadav et al. |
| 2018/0337939 A1 | 11/2018 | Agarwal |
| 2019/0052554 A1 | 2/2019 | Mukerji et al. |
| 2019/0146862 A1 | 5/2019 | Kephart et al. |
| 2019/0147074 A1 | 5/2019 | Kephart et al. |
| 2019/0149453 A1 | 5/2019 | Kephart et al. |
| 2019/0188616 A1 | 6/2019 | Urban et al. |
| 2019/0312888 A1 | 10/2019 | Grimm et al. |
| 2020/0073732 A1 | 3/2020 | Pradeep et al. |
| 2020/0104223 A1 | 4/2020 | Lowney et al. |

\* cited by examiner

SYSTEM FOR MITIGATING EXPOSURE ASSOCIATED WITH IDENTIFIED IMPACTS OF TECHNOLOGICAL SYSTEM CHANGES BASED ON SOLUTION DATA MODELLING

FIELD

The present invention relates to mitigating exposures associated with identified impacts of technological system changes utilizing solution data models.

BACKGROUND

Present conventional systems do not have the capability to identify all existing relationships within an entity. Lack of information associated with one or more relationships within an entity makes it difficult to identify impacts associated with a technological system change. As such, there exists a need for a system to identify all existing relationships within the entity and to identify impacts of technological systems changes based on the identified relationships in order to mitigate the impacts of technological system changes effectively.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for mitigating exposure associated with identified impacts of technological changes using solution data modeling. The invention generates one or more solution data models comprising a plurality of asset systems and a plurality of users, wherein each of the plurality of asset systems is associated with at least one user of the plurality of users and wherein at least a first of the plurality of asset systems is associated with at least a second of the plurality of asset systems, stores the one or more solution data models in the model database, receives an input associated with a technological system change associated with at least one first asset, accesses a solution data model associated with the at least one first asset, identifies one or more relationships from the accessed solution data model associated with the at least one first asset, identifies at least one impact associated with the technological system change based on the identified one or more relationships, determines a category of exposure based on the identified at least one impact, displays the category of exposure and the at least one impact via a graphical user interface to a user, receives one or more mitigation steps associated with the technological system change from the user, and implements the one or more mitigation steps received from the user.

In some embodiments, the invention generates the one or more solution data models by accessing one or more authentication systems, wherein the one or more authentication systems comprise authentication information associated with the plurality of asset systems and the plurality of users, extracting the authentication information associated with the plurality of asset systems and the plurality of users, accessing one or more human resources systems, wherein the one or more human resources systems comprise human resources information associated with the plurality of users, extracting the human resources information associated with the plurality of users, accessing one or more asset management systems, wherein the one or more asset management systems comprise asset information associated with at least type and location of the plurality of asset systems, extracting the asset information associated with plurality of asset systems, identifying a first set of relationships between each of the plurality of asset systems based on the extracted authentication information, identifying a second set of relationships between each of the plurality of users and each of the plurality of asset systems based on the extracted authentication information, and formulating the one or more solution data models based on the first set of relationships, the second set of relationships, the asset information, and the human resources information.

In some embodiments, the invention identifies the one or more relationships associated with the at least one first asset from the extracted solution data model by identifying one or more asset systems associated with the at least one first asset, identifying one or more applications associated with the at least one first asset, and identifying one or more users associated with the at least one first asset.

In some embodiments, the invention identifies the at least one impact by identifying a first count of the one or more asset systems, a second count of the one or more applications, and a third count of the one or more users, identifying a first set of critical asset systems from the one or more asset systems, and identifying a second set of critical applications from the one or more applications.

In some embodiments, the invention identifies the at least one impact by identifying upstream asset systems of the one or more asset systems associated with the at least one first asset.

In some embodiments, the invention identifies the impacts by identifying downstream asset systems of the one or more asset systems associated with the at least one first asset.

In some embodiments, the at least one first asset is an application or a system.

In some embodiments, the invention automatically determines mitigation steps based on the category of exposure of the technological system change and implements the mitigation steps to mitigate one or more exposures associated with the technological system change.

In some embodiments, the category of exposure is at least one of low, medium, and high.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
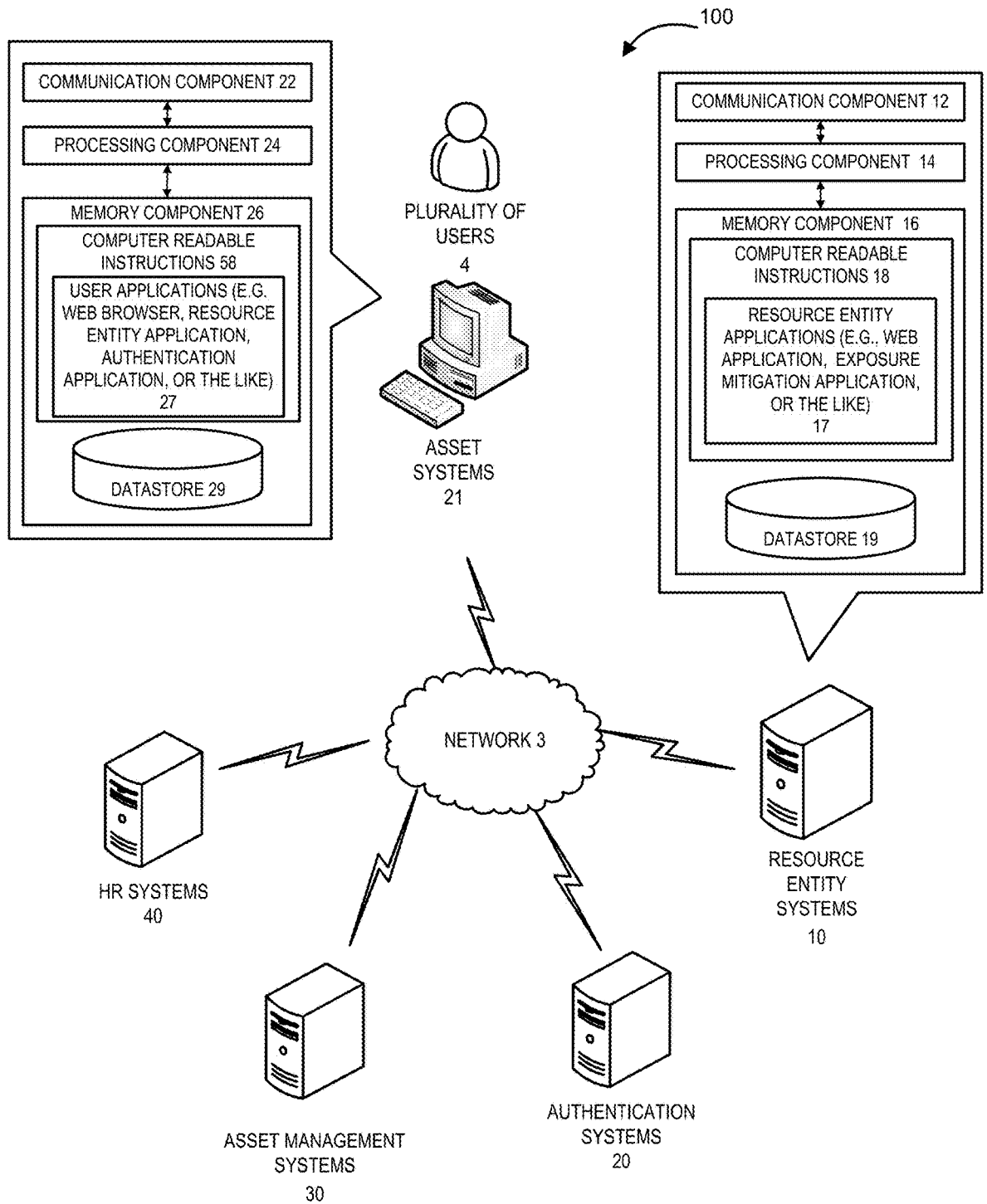

Having thus described embodiments of the invention in general terms, reference will now be made to the accompanying drawings, where:

FIG. 1 presents a block diagram illustrating the exposure mitigation system environment, in accordance with embodiments of the present invention.

Figure 2:
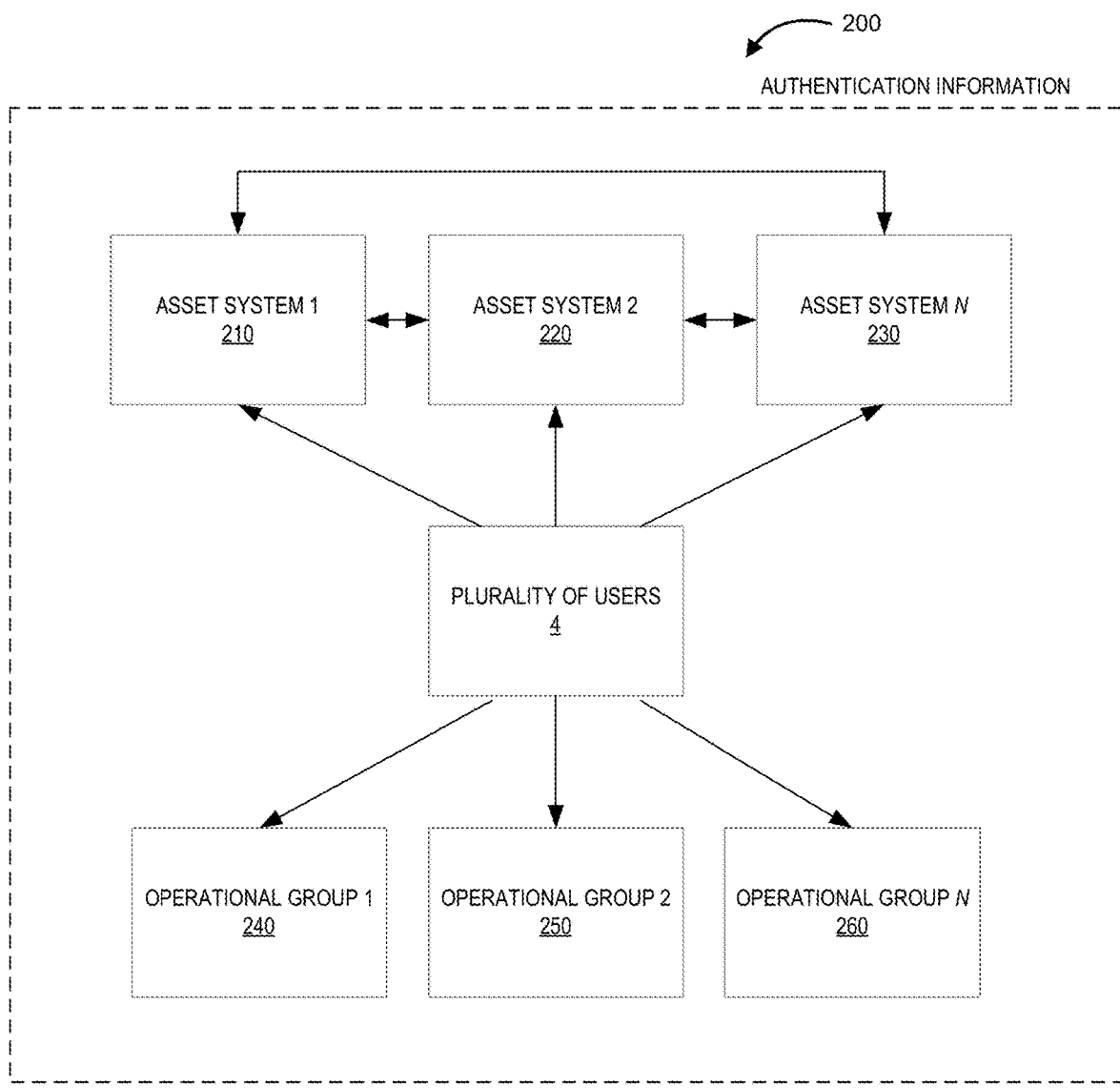

FIG. 2 presents a block diagram illustrating authentication information present in one or more authentication systems, in accordance with embodiments of the present invention.

Figure 3:
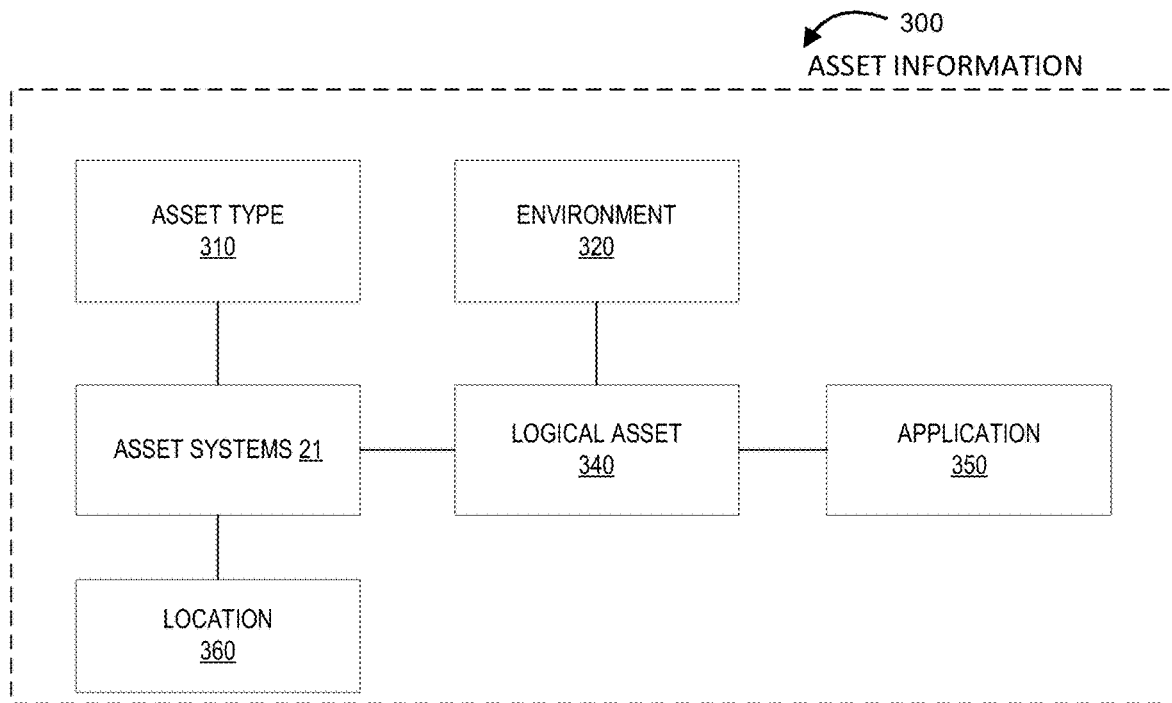

FIG. 3 presents a block diagram illustrating asset information present in one or more asset management systems, in accordance with embodiments of the present invention.

Figure 4:
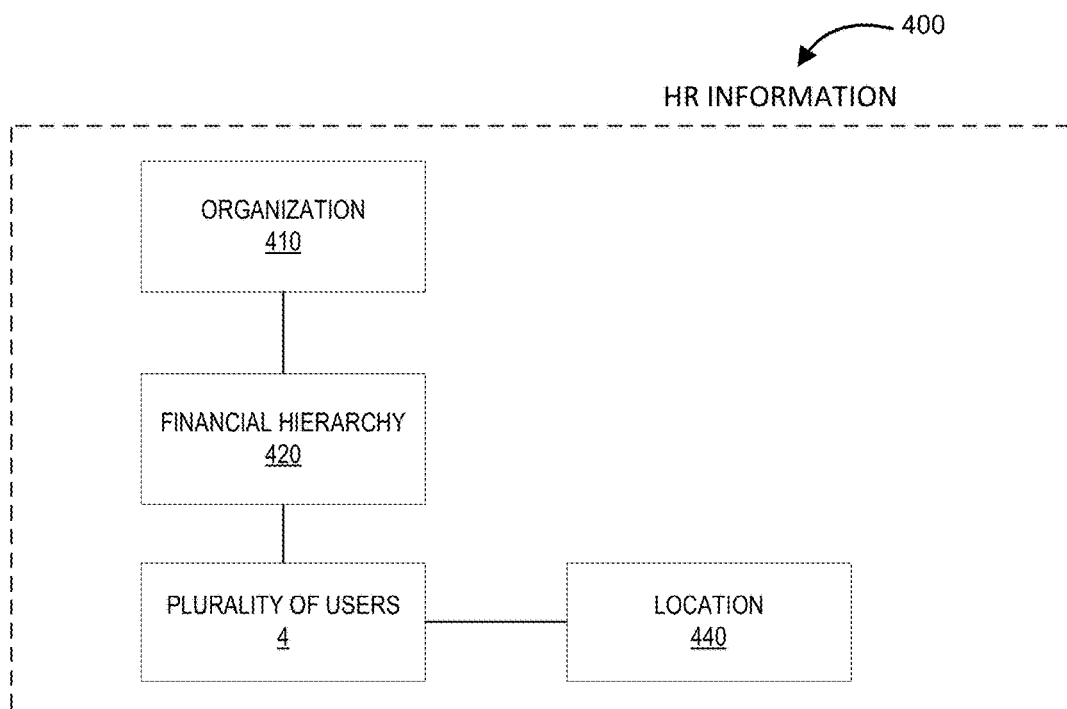

FIG. 4 presents a block diagram illustrating human resources information present in one or more human resources systems, in accordance with embodiments of the present invention.

Figure 5:
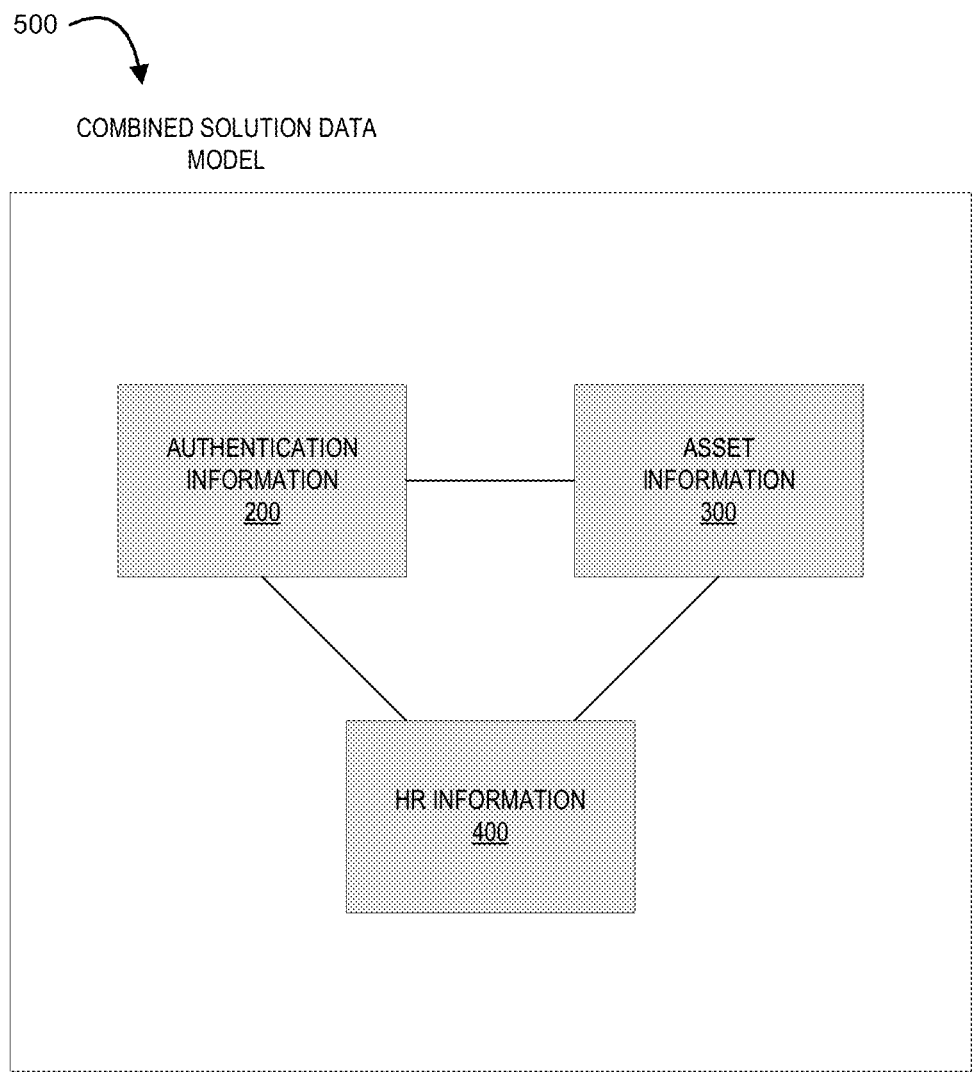

FIG. 5 presents a block diagram illustrating a combined solution data model generated by a resource entity system, in accordance with embodiments of the present invention.

Figure 6:
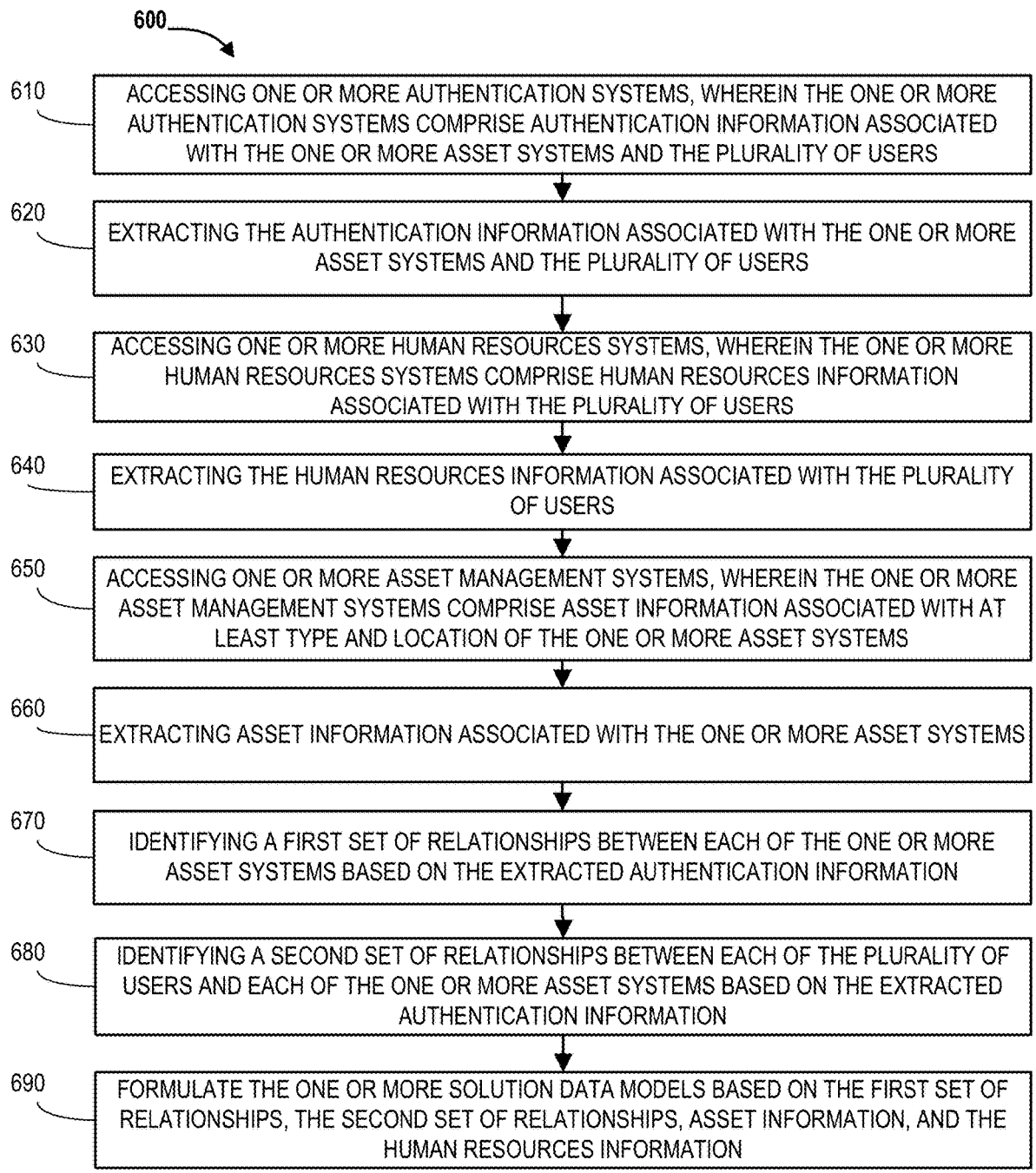

FIG. 6 presents a process flow illustrating generation of combined solution data model, in accordance with embodiments of the present invention.

Figure 7:
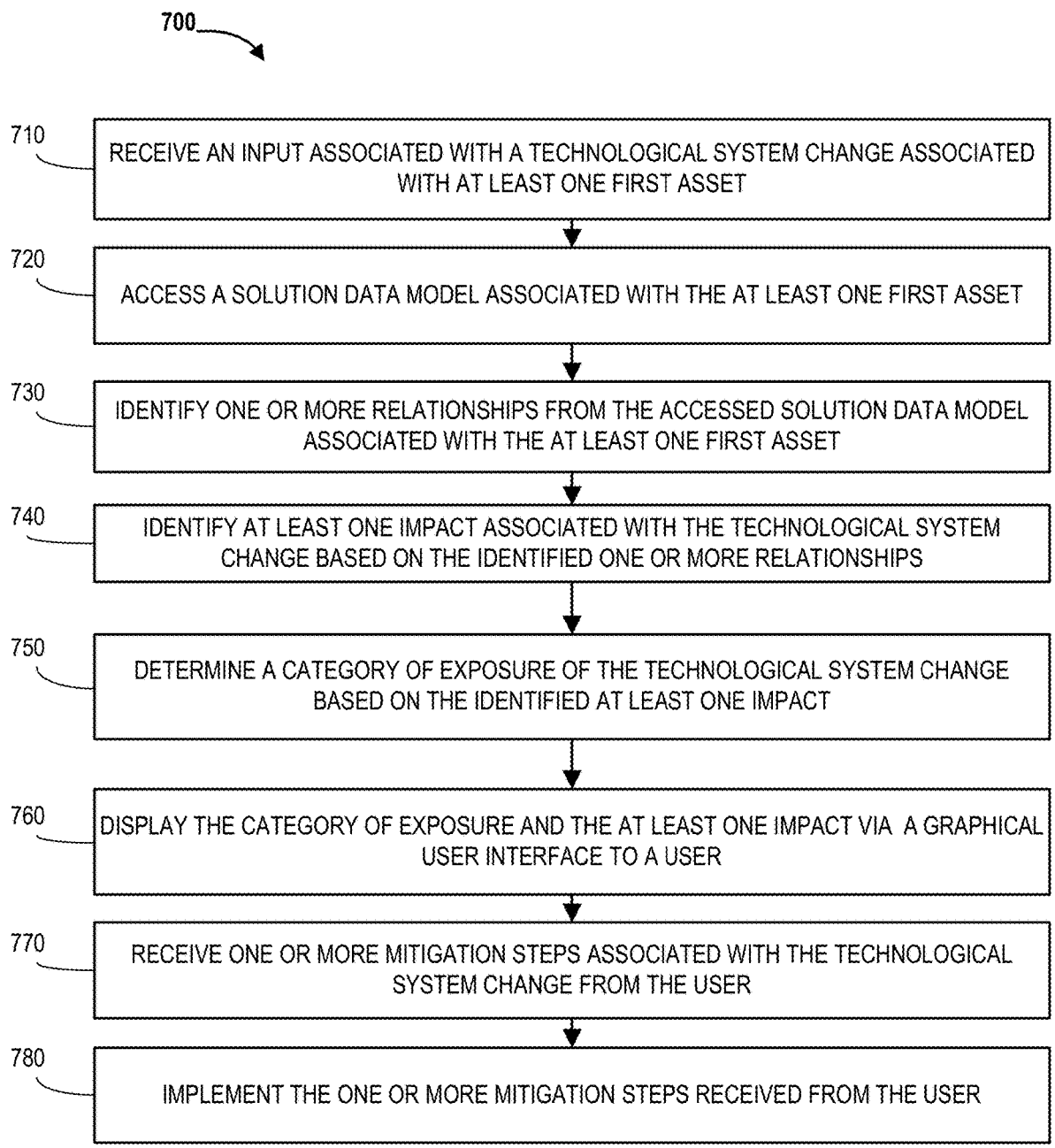

FIG. 7 presents a process flow for determining impacts associated with technological system changes and mitigating the impacts thereof, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for creating relationships between multiple asset systems, plurality of users, one or more applications, one or more logical assets, and/or the like leveraging existing data sets in one or more systems associated with a resource entity. Conventional systems utilize auto discovery tools to create the above mentioned relationships. However, the conventional auto discovery tools identify relationships between multiple asset systems by crawling into multiple systems based on a set of rules and accessing configuration files, or the like and cannot identify all existing relationships within an entity. The conventional auto discovery tools cannot identify relationships between the multiple asset systems and the one or more logical assets, one or more applications, and the plurality of users associated with the entity. Additionally, the conventional auto discovery tools are difficult to install, configure, and manage. The present system leverages already existing data within HR systems, asset management systems, and authentication systems providing authentication for the multiple asset systems, plurality of users, one or more applications, or the like to create combined solution data models comprising relationships between multiple asset systems, plurality of users, one or more applications, one or more logical assets.

Implementing technological system changes within an entity can be a difficult process without having the knowledge about what other applications or systems or users are affected by a technological system change to a system or an application. The present system facilitates implementation of the technological system changes by identifying and mitigating impacts associated with the technological system changes based on the solution data models generated by the system.

In accordance with embodiments of the invention, the terms "resource entity system" or "resource entity" may include any organization that processes financial transactions including, but not limited to, banks, credit unions, savings and loan associations, card associations, settlement associations, investment companies, stock brokerages, asset management firms, insurance companies and the like.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. In some embodiments, the "user" or "plurality of users" may be one or more associates, employees, agents, contractors, sub-contractors, third-party representatives, customers, and/or the like. Furthermore, as used herein, the term "asset systems" or "asset" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates a exposure mitigation system environment 100, in accordance with embodiments of the invention. As illustrated in FIG. 1, one or more resource entity systems 10 are operatively coupled, via a network 3, to asset systems 21, authentication system 20, asset management systems 30, and human resources (HR) systems 40. In this way, the plurality of users 4 (e.g., one or more associates, employees, agents, contractors, sub-contractors, third-party representatives, customers, or the like), through a user application 27 (e.g., web browser, resource entity application, authentication application, or the like), may access the asset systems 21 and other resource entity applications 17 (web application, exposure mitigation application, or the like) of the asset systems 21. In some embodiments, the exposure mitigation application may be a part of an independent exposure mitigation system. In such an embodiment, the independent exposure mitigation system is maintained and operated by the resource entity systems 10. The independent exposure mitigation system may comprise one or more processing devices operatively coupled to the one or more memory devices and configured to execute computer readable code stored in the one or more memory devices.

The network 3 may be a global area network (GAN), such as the Internet, a wide area network (WAN), a local area network (LAN), or any other type of network or combination of networks. The network 3 may provide for wireline, wireless, or a combination of wireline and wireless communication between systems, services, components, and/or devices on the network 3.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16. The authentication systems 20, the asset management systems 30, the human resources systems 40 may comprise similar structure and components as of the resource entity system 10 such as one or more communication components, one or more processing components, and one or more memory components.

The one or more processing components 14 use the one or more communication components 12 to communicate with the network 3 and other components on the network 3, such as, but not limited to, the components of the asset systems 21, the authentication systems 20, asset management systems 30, HR systems 40, or other systems. As such, the one or more communication components 12 generally comprise a wireless transceiver, modem, server, electrical connection, electrical circuit, or other component for communicating with other components on the network 3. The one or more communication components 12 may further include an interface that accepts one or more network interface cards, ports for connection of network components, Universal Serial Bus (USB) connectors and the like.

As further illustrated in FIG. 1, the resource entity systems 10 comprise computer-readable instructions 18 stored in the memory component 16, which in one embodiment includes the computer-readable instructions 18 of the resource entity application 17 (e.g., website application, exposure mitigation application, or the like). In some embodiments, the one or more memory components 16 include one or more data stores 19 for storing data related to the resource entity systems 10, including, but not limited to, data created, accessed, and/or used by the resource entity application 17. In embodiments of the present invention, the one or more data stores store the information extracted from the authentication systems 20, asset management systems 30, HR management systems 40, and/or the like. In some embodiments, information associated with the one or more assets, one or more applications and logical assets, the plurality of users is gathered by the resource entity applications 17 by communicating with other resource entity systems such as HR systems 40, asset management systems 30, authentication systems 40, and/or other systems associated with the resource entity. Additionally, the resource entity systems 10 comprise an artificial intelligence engine stored in the memory component 16 to generate one or more combined solution data models, in accordance with embodiments of the present invention. In embodiments of the present invention, the memory component 16 comprises a model database comprising the generated one or more combined solution data models.

As illustrated in FIG. 1, the plurality of users 4 may access the resource entity application 17, or other applications, through the asset systems 21. The asset systems 21 may be a desktop, mobile device (e.g., laptop, smartphone device, PDA, tablet, or other mobile device), or any other type of computer that generally comprises one or more communication components 22, one or more processing components 24, and one or more memory components 26. In some embodiments, the asset systems 21 may be servers. In some embodiments, the asset systems 21 may be cloud servers. In some embodiments, the asset systems may be repositories and/or the like.

The one or more processing components 24 are operatively coupled to the one or more communication components 22 and the one or more memory components 26. The one or more processing components 24 use the one or more communication components 22 to communicate with the network 3 and other components on the network 3, such as, but not limited to, the resource entity systems 10, the authentication systems 20, the HR systems 40, the asset management systems 30, and/or other systems. As such, the one or more communication components 22 generally comprise a wireless transceiver, modem, server, electrical connection, or other component for communicating with other components on the network 3. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the asset systems 21 may have computer-readable instructions 28 stored in the one or more memory components 26, which in one embodiment includes the computer-readable instructions 28 for user applications 27, such as authentication application (e.g., apps, applet, or the like), other resource entity applications, a web browser or other apps that allow the plurality of users 4 to take various actions, including allowing the plurality of users 4 to access applications located on other systems, or the like. The one or more memory components 26 comprise one or more data stores 29 to store data accessed by the asset systems 21 or data required to perform one or more processes or operations assigned to the asset systems 21. In some embodiments, the plurality of users utilize the user applications 27, through the asset systems 21, to access the resource entity applications 17 to perform various day to day organizational processes. In some embodiments, plurality of users 4 may utilize a HR application to store human resources information in the HR systems 40. In some embodiments, the plurality of users 4 may utilize asset management application to add information about new asset systems, delete information associated with old asset systems, modify location of the existing asset systems, and/or the like.

FIG. 2 presents a block diagram 200 illustrating authentication information present in one or more authentication systems 20. The one or more authentication systems 20 are any systems which control authorizations and authentications within the resource entity. The one or more authentication systems comprise authentication information and authorization information associated with one or more asset systems 21, plurality of users 4, one or more applications, and/or the like. Typically one or more asset systems 21 (such asset system 1 210, asset system 2 220, and asset system N 230) within an entity communicate with each other to implement multiple processes. For the one or more asset systems 21 to communicate with each other, authentication is necessary. For example, asset system 1 210 may access asset system 2 220 only after successful authentication. The one or more authentication systems 20 facilitate authentication between asset system 1 210 and asset system 2 220, wherein the authentication between asset system 1 210 and asset system 2 220 may be unidirectional or bidirectional. In some embodiments, the one or more authentication systems 20 may receive a request from asset system 1 210 to access asset system 2 220. Upon receiving the request, the one or more authentication systems 20 access a data store comprising approved authorizations within the resource entity, determine that the asset system 1 210 has authorization to access asset system 2 220, and authorize asset system 1 210 to access asset system 2 220. Approval for authorizations may be provided by a user of the plurality of users. Similarly, the one or more authentication systems provide authentication between plurality of users 4 and the one or more asset systems 21. For example, a user of the plurality of users 4 may send a request to the one or more authentication systems to access any one of the asset systems 21. The plurality of users 4 may belong to one or more organizational groups (organizational group 1 240, organizational group 2 250, operational group N 260). Organizational group may be defined as a group with multiple users belonging to a line of business. In one example, a group of users associated with human resources department are associated with human resources organizational group. In some embodiments, the authorizations to asset systems may be based on the organizational groups of the plurality of users. For example, 'n' number of users associated with organization group 1 240 may have authorization to access asset system 1 210. In some embodiments, the one or more authorization systems 20 may facilitate access between one or more applications within a resource entity. In some embodiments, the one or more authorization systems 20 may facilitate access between one or more applications within the entity and the plurality of users 4. In some embodiments, the one or more authorization systems 20 may facilitate access between one or more applications within the entity and the one or more asset systems 21.

FIG. 3 presents a block diagram 300 illustrating asset information present in one or more asset management systems 30. The one or more asset management systems 30 are any systems which manage and control one or more asset systems 21 within the resource entity. The one or more asset management systems 30 comprise information associated with the one or more asset systems 21 and the one or more applications within the resource entity. The one or more applications may be any software applications owned, maintained or utilized by the resource entity. In some embodiments, the one or more asset management systems 30 comprise information associated with asset type 310, environment 320, logical asset 340, application 350, and location 360 of the one or more asset systems 21. Asset type 310 defines the type of the one or more asset systems 21. For example, the one or more asset management systems 30 comprise information associated with the type of asset system 1 210 shown in FIG. 2, wherein the asset system 1 210 may be a repository. The one or more assets systems 21 may be repositories, relationship management systems, transaction systems, knowledge management systems, business intelligence systems, user systems assigned to the plurality of users 4, and/or the like. In one embodiment, the one or more asset management systems 30 comprise information associated with whether the one or more applications are critical applications or not. For example, if an application of the one or more applications is associated with important operations of the entity In one embodiment, the one or more asset management systems 30 comprise information associated with whether the one or more asset systems 21 are critical asset systems or not. For example, if an asset system of the one or more asset systems 21 is associated with important operations of the entity and if the failure of such an asset has a high impact on the business of the entity, the asset system is classified as critical. In one embodiment, the one or more asset management systems 30 comprise information associated with environment 320 of the one or more asset systems 21. Environment 320 may define operating system properties, physical properties, software properties, and/or the like of the one or more asset systems 21. In one embodiment, the one or more asset management systems 30 comprise information associated with location 360 of the one or more asset systems 21. For example, the one or more asset management systems 30 comprise physical address including country, state, city, street address, building number, floor number, cubicle location, and/or the like associated with the location of the asset system 1 210. In one embodiment, the one or more asset management systems 30 comprise information with logical assets 340 associated with the one or more asset systems 21. Logical asset information 340 may include logical partitions, virtual assets, and/or the like associated with each of the one or more asset systems 21. For example, asset system 1 210 may be configured into one or more virtual assets which may be utilized by any of the plurality of users 4 from any network associated with the resource entity. In one embodiment, the one or more asset management systems 30 comprise information with applications 360 associated with the one or more asset systems 21.

FIG. 4 presents a block diagram 400 illustrating presents a block diagram illustrating human resources information present in one or more human resources systems 40. The one or more human resources systems 40 may be any systems utilized by the human resources organization group within the resource entity. The one or more human resources systems comprise information associated with the plurality of users 4 within the resource entity. In one embodiment, the one or more human resources systems 40 comprise information associated with organization 410 of the plurality of users 4. The plurality of users 4 may be agents, contractors, sub-contractors, third-party representatives, and/or the like. Contractors, sub-contractors, third party representatives, may be associated with third party entities. For example, the one or more human resources systems may comprise organization information 410 associated with a first user of the plurality of users 4. The first user may be associated with a first third party entity, wherein the third party entity provides one or more contractors to the resource entity. In one embodiment, the one or more human resources systems 40 may comprise information associated with hierarchy information 420 associated with the plurality of users 4. For example, the one or more human resources systems 40 may comprise hierarchy information 420 associated with each of the plurality of users 4 such as one or more users reporting to a first user of the plurality of users 4, a reporting manager associated with the first user, one or more applications managed by the first user, and/or the like. In one embodiment, the one or more human resources systems 40 may comprise information associated with location 440 of each of the plurality of users 4. For example, the one or more human resources systems 40 comprise location information 440 associated with a first user of the plurality of users 4 such as work location address including country, state, city, street address, building number, floor number, cubicle location, and/or the like. In some embodiments, the one or more human resources systems 40 comprise all work locations associated with each of the plurality of users including the home work address, country, state, city, street address, building number, floor number, cubicle location, IP address, and/or the like.

FIG. 5 presents a block diagram 500 illustrating a combined solution data model generated by the artificial intelligence engine of the resource entity system 10. The resource entity system 10 extracts authentication information 200 from the one or more authentication systems 20, asset information 300 from the one or more asset management systems 30, human resources information 400 from the one or more human resources systems 40, and/or the like. The artificial intelligence engine intelligently applies logic to the extracted information from one or more systems and formulates a combined solution data model comprising one or more relationships between one or more assets systems 21, the plurality of users 4, and one or more logical assets and applications within the resource entity. In some embodiments, the combined solution data model may be stored in the form of database tables. The combined solution data models may be stored in any of available operational databases, relational databases, distribute databases, key value databases, column oriented databases, cloud database, big data, mobile database, active database, parallel database, virtual database, centralized database, navigational database, and/or the like. In some other embodiments, the combined solution data model may be stored in a data store in the form of tree data structure. In some embodiments, the combined solution data model may be split into multiple trees and each of the multiple trees may be linked with other multiples trees based on the one or more relationships. In some embodiment, the combined solution data model is in the form of a web. In some embodiments, the combined solution data model may be stored in the form of a list. In some embodiments, the combined solution data model may be stored in the form of any available data structures used to representing the one or more relationships. In some other embodiments, the combined solution data models may be stored in any graphical form in the data store of the system. In some embodiments, the combined solution data models is an integrated semantic model. In some embodiments, the combined solution data models is a schema model.

FIG. 6 presents a process flow 600 illustrating generation of combined solution data model by the artificial intelligence engine of the resource entity system 10. As shown in block 610, the system accesses one or more authentication systems, wherein the one or more authentication systems comprise authentication information associated with the one or more asset systems and the plurality of users 4. The authentication information may be stored in a data store of the authentication system and the system may access the data store of the one or more authentication system. In some embodiments, the one or more authentication systems may authorize the system to access the authentication information stored in the data store of the one or more authentication systems. As shown in block 620, the system extracts the authentication information associated with the one or more asset systems and the plurality of users. In some embodiments, the extracted information may include only active authentications present in the data store. Active authentications may be any authentication used by the plurality of users or the one or more asset systems or the one or more applications or logical assets associated with the resource entity within a predetermined amount of time. In some embodiments, the predetermined amount of time may be assigned by the resource entity. For example, the system may assign twelve months as the predetermined amount of time. In some embodiments, the system may perform routine maintenance on the one or more authentication systems 20 at regular intervals and delete all inactive forms of authentication present in the one or more authentication systems, thereby having the information ready for extraction during the process of generation of the combined solution data models. In such embodiments, the system may delete the inactive authentications only after receiving an approval from a relevant user. The relevant user may be associated with a first asset system or a first user associated with the inactive authentication. For example, the inactive authentication may be associated with a user who is not associated with the resource entity. The system may identify a reporting manager assigned to the user and may send the reporting manager a request for approval to delete the inactive authentication. In some embodiments, the authentication information may include reference identifiers associated with the plurality of users 4, the one or more asset systems 21, the one or more applications or logical assets, and/or the like. In some embodiments, the authentication information may include historical data logs comprising all authentications approved by the one or more authentication systems.

As shown in block 630, the system accesses the one or more human resources systems, wherein the one or more human resources systems comprise human resources information associated with the plurality of users. Human resources information may be inputted into the one or more human resources systems 40 by one or more plurality of users associated with human resources organizational group. The human resources information may include location information, hierarchy information, organization information, personal information, and/or the like. As shown in block 640, the system extracts the human resources information associated with the plurality of users. The system upon extracting the human resources information may sort the human resources information and store it in the data store of the system based on the human resources identifier, thereby providing easy retrieval of human resources information during the process of generation of combined solution data models.

As shown in block 650, the system accesses the one or more asset management systems, wherein the one or more asset management system comprises asset information associated with at least the type and location of the one or more asset systems. The asset information may also include environment information, logical asset information, application information, and/or the like associated with the one or more asset systems 21. The asset information may also include information whether the one or more asset systems 21 are critical asset systems or not and whether the one or more applications are critical applications or not. As shown in block 660, the system extracts asset information associated with the one or more asset systems. The system, after extracting the asset information, may sort the asset information and may store it in the data store of the system based on asset reference identifier, thereby providing easy retrieval of asset information during the process of generation of combined solution data models.

As shown in block 670, the system identifies a first set of relationships between each of the one or more asset systems based on the extracted authentication information. The first set of relationships may include all forms of active authentication records present in the extracted authentication information between each of the one or more asset systems based on the historical data log information extracted from the one or more authentication systems. For example, the system may identify all entries in the historical data log information associated with a first asset reference identifier. In some embodiments, the system, after identifying the first set of relationships, may place the first set of relationships in temporary storage of the system such as random access memory for easy retrieval. In such embodiments, the system may identify duplicate relationships from the first set of relationships and may delete the duplicate relationships before storing the first set of relationships in the data store. For example, the system may identify all entries in the historical log information associated with a first reference identifier and a second reference identifier. When a first asset system associated with the first reference identifier and a second asset system associated with the second reference identifier communicate with each other, after identifying the entries associated with the first asset system and the second asset system, the system deletes duplicate records. In some embodiments, the system, after identifying the first set of relationships, may place the first set of relationships in both temporary storage and permanent storage of the system. Additionally, in some embodiments, the system may also identify relationships between multiple applications based on the extracted authentication information. For example, an application 'A' associated with asset system 1 may be accessing an application 'B' in asset system 2 and the system identifies the relationship between application 'A' and application 'B' based on historical data log information and may place this information in the temporary storage for easy retrieval.

As shown in block 680, the system identifies a second set of relationships between each of the one or more asset systems and each of the plurality of users based on the extracted authentication information. The second set of relationships may include all forms of active authentication present in the extracted authentication information between each of the one or more asset systems and each of the plurality of users based on the historical data log information extracted from the one or more authentication systems. For example, the system may identify all entries in the historical data log information associated with a first human resources identifier. In some embodiments, the system after identifying the second set of relationships, may place the second set of relationships in the temporary storage of the system such as random access memory for easy retrieval. In such embodiments, the system may identify duplicate relationships from the second set of relationships and may delete the duplicate relationships before storing the second set of relationships in the data store.

As shown in block 690, the system formulates the one or more solution data models based on the first set of relationships, the second set of relationships, asset information, and the human resources information. For example, for a relationship between the first asset system and the second asset system, the system identifies and links the asset information associated with the first asset reference identifier and the second asset reference identifier with the relationship. In another example, for a second relationship between the first asset system and a first user, the system identifies and links asset information associated with the first asset reference identifier and human resources information associated with the first human resources identifier with the relationship. The system combines all relationships and generates combined solution data models, wherein the combined solution data models show one or more users associated with each of the asset systems, one or more asset systems connected with the each of the asset systems, one or more applications and logical assets associated with each of the asset systems. The combined data solution models also show lineage within an entity. In some embodiments, the system may generate one single unified data solution model. In some other embodiments, the system may generate multiple data solution models and link them with identifiers to form a combined solution data model.

FIG. 7 presents a process flow 700 for determining impacts associated with technological system changes and mitigating the impacts thereof, in accordance with embodiments of the present invention. As shown in block 710, the system receives an input associated with a technological system change associated with at least one first asset. In some embodiments, technological system change may be a major change including, but not limited to, environment change, rolling over to a new operating system, moving to a new application, or the like. In some embodiments, technological system change may be a minor change including, but not limited to, updating an already existing application, updating an already existing operating system, or the like. In some embodiments, the system receives the input from a user of the plurality of users of the entity. In some other embodiments, the system receives the input from a different system, which is not part of the system of the present invention. In some embodiments, the system automatically identifies occurrence of a technological system change associated with the at least one first asset based on historical data. For example, the system may identify that software associated with an asset system is updated every month and the system automatically identifies that the asset system is scheduled for a technological system change.

As shown in block 720, the system accesses a solution data model associated with the at least one first asset from the generated one or more solution data models in the model database. For example, system may search the model database using the reference identifier of the at least one first asset.

As shown in block 730, the system identifies one or more relationships from the accessed solution data model associated with the at least one first asset. Identifying the one or more relationships comprises identifying one or more asset systems, one or more applications, one or more users associated with the at least one first asset. Identifying one or more asset systems comprises identifying all asset systems and applications which are upstream and downstream to the at least one first asset.

As shown in block 740, the system identifies at least one impact associated with the technological system change based on the identified one or more relationships. The system identifies at least one impact by determining one or more asset systems linked to the at least one first asset, one or more applications associated with the at least one first asset, and one or more users linked with the at least one first asset. For example, the system identifies from the one or more relationships that three asset systems are connected to the at least one first asset, and two applications are utilizing the at least one first asset, and ten users are utilizing the at least one first asset and determines that three asset systems, two applications, and ten users may be impacted if the technological system change to the at least one first asset fails. The system further determines a first count of the one or more asset systems, a second count of the one or more applications, a third count of the one or more users associated with the at least a first set of critical asset systems from the one or more asset systems, and identifying a second set of critical applications from the one or more applications. In one embodiment of the present invention, the system identifies a first set of critical asset systems from the determined one or more asset systems and a second set of critical applications from the determined one or more applications. The system determines the first set of critical asset systems and the second set of critical applications from the information in the solution data model. Continuing with the previous example, the system identifies from the three asset systems linked with the at least one first asset, all three asset systems are critical asset systems. The system further identifies from the two applications associated with at least one first asset, one application is critical.

As shown in block 750, the system determines a category of exposure associated with the technological system change based on the identified at least one impact. The category of exposure may be low, medium, high, or the like. Continuing with the previous example, the system after determining that three asset systems, two applications, and ten users may be impacted if the technological system change to the at least one first asset fails and that all three asset systems are critical asset systems and two applications are critical applications, the system based on applying logic the system identifies that the category of exposure is low. In some embodiments, the metrics associated with applying logic for categorizing the exposure may be defined by a user. In alternate embodiments, the metrics associated with applying logic for categorizing the exposure may be defined by the system automatically based on calculating business impact.

As shown in block 760, the system displays the category of exposure and the at least one impact via a graphical user interface to a user. In one embodiment, wherein the system receives the input from the first user, the system displays the category of exposure on asset system utilized by the first user. In alternate embodiments, the system displays the category of exposure and the at least one impact via the graphical user interface to all users associated with the determined the one or more asset systems and the one or more applications and to the one or more users linked with the at least one first asset. In some embodiments, the system may present the solution data model associated with at least one first asset using any of the visualization techniques. The system also displays information associated with the one or more asset systems, the one or more applications, and the one or more users when a user hovers on any part of the solution data model.

As shown in block 770, the system receives one or more mitigation steps associated with the technological system change from the user. The mitigation steps may be any measures implemented to mitigate the impact if the technological system change associated with the at least one first asset fails. The mitigation steps may include allocating a second asset system to perform the tasks or operations of the at least one first asset, or the like. In some embodiments, the second asset system may be an asset system which may be on the same level as the at least one first asset in the solution data model. In some embodiments, the second asset system may be upstream to the at least one first asset. In some embodiments, the second asset system may be downstream to the at least one first asset. In some embodiments, the one or more mitigation steps may include cancelling or rescheduling the technological system change.

As shown in block 780, the system implements the one or more mitigation steps received from the user. In some embodiments, the system may automatically identify and implement the one or more mitigation steps when the category of exposure is low. In some embodiments, the system may automatically identify and implement the one or more mitigation steps after notifying a concerned user. In some embodiments, the system automatically identifies the one or more mitigation steps using artificial intelligence. In some embodiments, the system automatically identifies the one or more mitigation steps using historical data, wherein historical data include measures taken previously to mitigate similar type of impacts. In some embodiments, when the category of exposure is high, the system automatically identifies the one or more mitigation steps and displays the identified one or more mitigation steps to the user. In such an embodiment, the system implements the one or more mitigation steps only after receiving an approval from the concerned user. The present system also allows a user to track what technological changes are taking place within an entity and allows the users to schedule technological system changes. For example, a user may identify that four technological system changes with high category of exposure are scheduled to be implemented on the same day via the present system and may reschedule some of the technological system changes. In some cases, the system may identify that four technological system changes with high category of exposure are scheduled to be implemented on the same day and may notify concerned users. In some embodiments, the system may identify that an asset system is behaving erratically and based on the solution data model, the system may track down the cause to a technological system change implemented either upstream or downstream to the asset system behaving erratically. The system may notify concerned users about the erratic behavior caused by the technological system change.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/814,028 | SYSTEM FOR TECHNOLOGY ANOMALY DETECTION, TRIAGE AND RESPONSE USING SOLUTION DATA MODELING | Nov. 15, 2017 |
| 15/814,038 | IMPLEMENTING A CONTINUITY PLAN GENERATED USING SOLUTION DATA MODELING BASED ON PREDICTED FUTURE EVENT SIMULATION TESTING | Nov. 15, 2017 |

| U.S. patent application Ser. No. | Title | Filed On |
|---|---|---|
| 15/814,044 | SYSTEM FOR REROUTING ELECTRONIC DATA TRANSMISSIONS BASED ON GENERATED SOLUTION DATA MODELS | Nov. 15, 2017 |
| To be assigned | SYSTEM FOR MITIGATING EXPOSURE ASSOCIATED WITH IDENTIFIED UNMANAGED DEVICES IN A NETWORK USING SOLUTION DATA MODELLING | Concurrently herewith |
| To be assigned | SYSTEM FOR MITIGATING INTENTIONAL AND UNINTENTIONAL EXPOSURES USING SOLUTION DATA MODELLING | Concurrently herewith |
| To be assigned | SYSTEM FOR DECOMMISSIONING INFORMATION TECHNOLOGY ASSETS USING SOLUTION DATA MODELLING | Concurrently herewith |

What is claimed is:

1. A system for mitigating exposure associated with identified impacts of technological changes using solution data modeling, the system comprising:
   one or more memory devices having computer readable code stored thereon; wherein the one or more memory devices comprises a plurality of databases comprising a model database and an incident database;
   one or more processing devices operatively coupled to the one or more memory devices, wherein the one or more processing devices are configured to execute the computer readable code to:
      generate one or more solution data models comprising a plurality of asset systems and a plurality of users, wherein each of the plurality of asset systems is associated with at least one user of the plurality of users and wherein at least a first of the plurality of asset systems is associated with at least a second of the plurality of asset systems, wherein generating the one or more solution data models comprises:
         accessing one or more authentication systems, wherein the one or more authentication systems comprise authentication information associated with the plurality of asset systems and the plurality of users;
         extracting the authentication information associated with the plurality of asset systems and the plurality of users;
         accessing one or more human resources systems, wherein the one or more human resources systems comprise human resources information associated with the plurality of users;
         extracting the human resources information associated with the plurality of users;
         accessing one or more asset management systems, wherein the one or more asset management systems comprise asset information associated with at least type and location of the plurality of asset systems;
         extracting the asset information associated with plurality of asset systems;
         identifying a first set of relationships between each of the plurality of asset systems based on the extracted authentication information;
         storing the first set of relationships in a temporary storage of the memory;
         identifying a second set of relationships between each of the plurality of users and each of the plurality of asset systems based on the extracted authentication information;
         storing the second set of relationships in a temporary storage of the memory; and
         formulating the one or more solution data models based on the first set of relationships, the second set of relationships, the asset information, and the human resources information;
      store the one or more solution data models in the model database;
      receive an input associated with a technological system change associated with at least one first asset;
      access a solution data model associated with the at least one first asset;
      identify one or more relationships from the accessed solution data model associated with the at least one first asset;
      identify at least one impact associated with the technological system change based on the identified one or more relationships;
      determine a category of exposure based on the identified at least one impact;
      display the category of exposure and the at least one impact via a graphical user interface to a user;
      receive one or more mitigation steps associated with the technological system change from the user; and
      implement the one or more mitigation steps received from the user.

2. The system of claim 1, wherein identifying the one or more relationships associated with the at least one first asset from the extracted solution data model comprises:
   identifying one or more asset systems associated with the at least one first asset;
   identifying one or more applications associated with the at least one first asset; and
   identifying one or more users associated with the at least one first asset.

3. The system of claim 2, wherein identifying the at least one impact comprises:
   identifying a first count of the one or more asset systems, a second count of the one or more applications, and a third count of the one or more users;
   identifying a first set of critical asset systems from the one or more asset systems; and
   identifying a second set of critical applications from the one or more applications.

4. The system of claim 2, wherein identifying the at least one impact comprises identifying upstream asset systems of the one or more asset systems associated with the at least one first asset.

5. The system of claim 2, wherein identifying the at least one impact comprises identifying downstream asset systems of the one or more asset systems associated with the at least one first asset.

6. The system of claim 1, wherein the at least one first asset is an application or a system.

7. The system of claim 1, wherein the one or more processing devices are configured to execute the computer readable code to:

automatically determine mitigation steps based on the category of exposure of the technological system change; and implement the mitigation steps to mitigate one or more exposures associated with the technological system change.

8. The system of claim 1, wherein the category of exposure is at least one of low, medium, and high.

9. A computer program product for mitigating exposure associated with identified impacts of technological changes using solution data modeling, the computer program product comprising at least one non-transitory computer-readable medium having computer-readable program code portions embodied therein, the computer-readable program code portions comprises one or more executable portions for:

generating one or more solution data models comprising a plurality of asset systems and a plurality of users, wherein each of the plurality of asset systems is associated with at least one user of the plurality of users and wherein at least a first of the plurality of asset systems is associated with at least a second of the plurality of asset systems, wherein generating the one or more solution data models comprises:

accessing one or more authentication systems, wherein the one or more authentication systems comprise authentication information associated with the plurality of asset systems and the plurality of users;

extracting the authentication information associated with the plurality of asset systems and the plurality of users;

accessing one or more human resources systems, wherein the one or more human resources systems comprise human resources information associated with the plurality of users;

extracting the human resources information associated with the plurality of users;

accessing one or more asset management systems, wherein the one or more asset management systems comprise asset information associated with at least type and location of the plurality of asset systems;

extracting the asset information associated with plurality of asset systems;

identifying a first set of relationships between each of the plurality of asset systems based on the extracted authentication information;

storing the first set of relationships in a temporary storage of the memory;

identifying a second set of relationships between each of the plurality of users and each of the plurality of asset systems based on the extracted authentication information;

storing the second set of relationships in a temporary storage of the memory; and formulating the one or more solution data models based on the first set of relationships, the second set of relationships, the asset information, and the human resources information;

storing the one or more solution data models in a model database;

receiving an input associated with a technological system change associated with at least one first asset;

accessing a solution data model associated with the at least one first asset from the model database;

identifying one or more relationships from the accessed solution data model associated with the at least one first asset;

identifying at least one impact associated with the technological system change based on the identified one or more relationships;

determining a category of exposure based on the identified at least one impact;

displaying the category of exposure and the at least one impact via a graphical user interface to a user;

receiving one or more mitigation steps associated with the technological system change from the user; and implementing the one or more mitigation steps received from the user.

10. The computer program product of claim 9, wherein identifying the one or more relationships associated with the at least one first asset from the extracted solution data model comprises:

identifying one or more asset systems associated with the at least one first asset;

identifying one or more applications associated with the at least one first asset; and identifying one or more users associated with the at least one first asset.

11. The computer program product of claim 10, wherein identifying the at least one impact comprises identifying downstream asset systems of the one or more asset systems associated with the at least one first asset.

12. The computer program product of claim 10, wherein identifying the at least one impact comprises:

identifying a first count of the one or more asset systems, a second count of the one or more applications, and a third count of the one or more users;

identifying a first set of critical asset systems from the one or more asset systems; and identifying a second set of critical applications from the one or more applications.

13. The computer program product of claim 10, wherein identifying the at least one impact comprises identifying upstream asset systems of the one or more asset systems associated with the at least one first asset.

14. The computer program product of claim 9, wherein the one or more processing devices are configured to execute the computer readable code to:

automatically determine mitigation steps based on the category of exposure of the technological system change; and implement the mitigation steps to mitigate one or more exposures associated with the technological system change.

15. The computer program product of claim 9, wherein the at least one first asset is an application or a system.

16. The computer program product of claim 9, wherein the category of exposure is at least one of low, medium, and high.

17. A computer implemented method for mitigating exposure associated with identified impacts of technological changes using solution data modeling, the method comprises:

providing a computing system comprising a computer processing device and a non-transitory computer readable medium, where the computer readable medium comprises configured computer program instruction code, such that when said instruction code is operated by said computer processing device, said computer processing device performs the following operations:

generating one or more solution data models comprising a plurality of asset systems and a plurality of users, wherein each of the plurality of asset systems is associated with at least one user of the plurality of users and wherein at least a first of the plurality of asset systems is associated with at least a second of the plurality of asset systems, wherein generating the one or more solution data models comprises:
- accessing one or more authentication systems, wherein the one or more authentication systems comprise authentication information associated with the plurality of asset systems and the plurality of users;
- extracting the authentication information associated with the plurality of asset systems and the plurality of users;
- accessing one or more human resources systems, wherein the one or more human resources systems comprise human resources information associated with the plurality of users;
- extracting the human resources information associated with the plurality of users;
- accessing one or more asset management systems, wherein the one or more asset management systems comprise asset information associated with at least type and location of the plurality of asset systems;
- extracting the asset information associated with plurality of asset systems;
- identifying a first set of relationships between each of the plurality of asset systems based on the extracted authentication information;
- storing the first set of relationships in a temporary storage of the memory;
- identifying a second set of relationships between each of the plurality of users and each of the plurality of asset systems based on the extracted authentication information;
- storing the second set of relationships in a temporary storage of the memory; and
- formulating the one or more solution data models based on the first set of relationships, the second set of relationships, the asset information, and the human resources information;
- storing the one or more solution data models in a model database;
- receiving an input associated with a technological system change associated with at least one first asset;
- accessing a solution data model associated with the at least one first asset from the model database;
- identifying one or more relationships from the accessed solution data model associated with the at least one first asset;
- identifying at least one impact associated with the technological system change based on the identified one or more relationships;
- determining a category of exposure based on the identified at least one impact;
- displaying the category of exposure and the at least one impact via a graphical user interface to a user;
- receiving one or more mitigation steps associated with the technological system change from the user; and
- implementing the one or more mitigation steps received from the user.

18. The computer implemented method of claim 17, wherein identifying the one or more relationships associated with the at least one first asset from the extracted solution data model comprises:
- identifying one or more asset systems associated with the at least one first asset;
- identifying one or more applications associated with the at least one first asset; and
- identifying one or more users associated with the at least one first asset.

19. The computer implemented method of claim 18, wherein identifying the at least one impact comprises:
- identifying a first count of the one or more asset systems, a second count of the one or more applications, and a third count of the one or more users;
- identifying a first set of critical asset systems from the one or more asset systems; and
- identifying a second set of critical applications from the one or more applications.

20. The computer implemented method of claim 17, wherein the category of exposure is at least one of low, medium, and high.

* * * * *